United States Patent [19]

Wagner

[11] Patent Number: 4,742,348
[45] Date of Patent: May 3, 1988

[54] TRIANGULAR MATRIX DEVICE FOR THE ASSIGNMENT OF PRIORITIES

[75] Inventor: Wolfgang Wagner, Munich, Fed. Rep. of Germany

[73] Assignee: Siemens Aktiengesellschaft, Berlin and Munich, Fed. Rep. of Germany

[21] Appl. No.: 772,169

[22] Filed: Sep. 3, 1985

[30] Foreign Application Priority Data

Sep. 5, 1984 [DE] Fed. Rep. of Germany ....... 3432656

[51] Int. Cl.⁴ .................. H04Q 9/00; H04Q 11/04
[52] U.S. Cl. .................. 340/825.500; 340/825.910; 340/825.030
[58] Field of Search ........... 340/825.5, 825.51, 825.03, 340/825.22, 826, 825.79, 825.91, 825.93; 379/248

[56] References Cited

U.S. PATENT DOCUMENTS

| | | | |
|---|---|---|---|
| 3,353,160 | 11/1967 | Lindquist | 340/825.02 |
| 3,643,218 | 2/1972 | Cramwinkel | 364/200 |
| 3,984,819 | 10/1976 | Anderson | 364/200 |
| 4,198,546 | 4/1980 | Schlichte | 340/826 |
| 4,232,294 | 11/1980 | Burke et al. | 340/825.5 |
| 4,399,439 | 8/1983 | Upadhyayula | 340/825.91 |
| 4,403,192 | 9/1983 | Williman | 340/825.5 |
| 4,488,151 | 12/1984 | Bolton et al. | 340/825.03 |
| 4,546,450 | 10/1985 | Kanuma | 340/825.51 |
| 4,630,046 | 12/1986 | Rein | 340/825.93 |

FOREIGN PATENT DOCUMENTS

0076196 6/1983 European Pat. Off. .

OTHER PUBLICATIONS

IBM Technical Disclosure Bulletin, vol. 17, No. 7, Dec. 1974, "Programmable Priority Mechanism" by N. T. Christensen.

Primary Examiner—Donald J. Yusko
Attorney, Agent, or Firm—Herbert L. Lerner; Laurence A. Greenberg

[57] ABSTRACT

Device for assigning priorities having a plurality of request channels addressed by request signals, including a plurality of output channels arranged with the request channels in matrix form, each of the request channels being directly connected to one of the output channels and being connected to the respective remainder of the plurality of output channels via a respective switching element controlled by a request signal blocking the appertaining output channels.

7 Claims, 4 Drawing Sheets

TRIANGULAR MATRIX DEVICE FOR THE ASSIGNMENT OF PRIORITIES

The invention relates to a device for assigning priorities having a plurality of request channels addressed by request signals.

In parallel operation of a plurality of processors or other dependently operating computer units, assurance must be provided that only one processor will always have control over common arrangements or devices, for example, over data buses, control lines, memories and the like and that all others are in a state of waiting. In this regard, a device for assigning priorities serves to seek out, from several simultaneous requests, the one request which has the highest priority at the time in question.

Two types of priorities are differentiated between in the allotment of priorities. In one scheme of priorities with fixed priorities, the order of priorities does not change. An example thereof is a priority chain built as series-connected flipflops. In a rotating priority, on the other hand, all requests are considered to be of like importance, the priorities being dynamically variable. Processors with frequent request demands, for example, can thereby be assigned lower priorities temporarily, so that processors with infrequent request demands receive the desired access through a high priority assignment and are not blocked.

It is accordingly an object of the invention to provide a device assigning priorities of the foregoing general type which ensures a setting of the priority of every request individually and an assignment of like or equal priorities by groups.

With the foregoing and other objects in view, there is provided, in accordance with the invention, a device for assigning priorities having a plurality of request channels addressed by request signals, including a plurality of output channels arranged with the request channels in matrix form, each of the request channels being directly connected to one of the output channels and being connected to the respective remainder of the plurality of output channels via a respective switching element controlled by a request signal blocking the appertaining output channels.

In accordance with another feature of the invention, the request channels, the output channels and the switching elements form a triangular matrix.

In accordance with a further feature of the invention, the switching element is formed of two cross-coupled FETs respectively addressed via a request and output channel, respectively.

In accordance with an additional feature of the invention, each of the switching elements has rotation control means for temporarily suppressing the switching function thereof.

In accordance with an added feature of the invention, each of the switching elements is formed of two cross-coupled FETs respectively addressed via a request and output channel, respectively, and the rotation control means have other FETs addressed in opposite phases and located at base points of the cross-coupled FETs forming the switching elements.

In accordance with yet a further feature of the invention, the other FETs of the rotation control means are addressed via a flipflop.

In accordance with a concomitant feature of the invention, there is provided, a control for holding the respective states, the control being preconnected to the rotation control means.

The invention offers the advantage that high flexibility of the priority assignment is achieved with a limited amount of circuitry. Fixed and rotating priorities can be realized as well as combinations of the two types of priorities which are adaptable in a relatively simple manner to the respective requirements. In this regard, the rotation method is fair with respect to infrequent requests. Due to the matrix structure according to the invention and to the use of identical cells, the arrangement or device of the invention is highly suited for integrated circuits, because the duplication of cells minimizes the technical expense for producing the layout.

A further embodiment of the invention, in which the desired scheme of priorities is adjustable via a data processing program, has the advantage that the priority of the individual request channels can be set independently of one another, and the modularity is thus increased.

Other features which are considered as characteristic for the invention are set forth in the appended claims.

Although the invention is illustrated and described herein as embodied in device for the assignment of priorities, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which.

In accordance with the invention the arrangement for the priority assignment is shown wired as the network in the figures. In order to make the presentation clearer, the network is shown in three parts A, B and C wired together in themselves according to FIGS. 1, 2 and 4, respectively. The respective subsidiary circuits shown schematically in the nodes are correspondingly realized in a matrix element $D_{ij}$ as shown in FIG. 5. A complete presentation of a network can be found, for example, in FIGS. 6 and 7, respectively.

Figure 1:
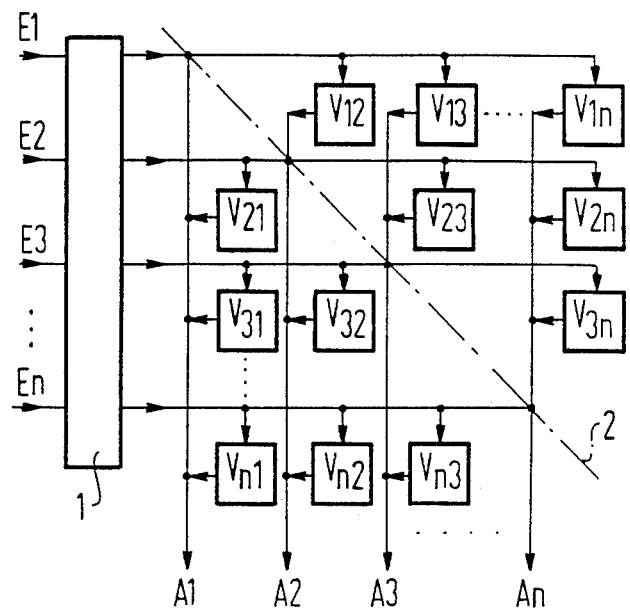
FIG. 1 is a schematic block diagram of a first part of a priority network.

As FIG. 1 shows with respect to part A, the priority network has several request channels $E_i$ ($i = 1$ to $n$) and a like number of output channels $A_j$ ($j = 1$ to $n$). Each request channel $E_i$ is permanently connected to an output channel $A_i$ (in the example embodiment of FIGS. 1 and 2, along a principal diagonal 2) and are connected at the remaining crossings to the remaining output channels $A_j$ via respective switching elements $V_{ij}$. On the input side, the matrix is preceded by a decoupling device 1.

In this matrix arrangement, a priority which has the highest actual priority is picked out from among simultaneous priority requests on the request channels $E_i$. Because each channel can occupy any position within the priority sequence, all channels are treated the same from the point of view of circuit construction.

Every request channel $E_i$ therefore must be checked for presence of a possible request signal on every other request channel. if a request is present on one of the channels $E_i$, the switching element $V_{ij}$ suppresses a request on the other channels (j=i), if the channel $E_i$ has a higher actual priority than the channel $E_j$. In this manner, only the request with the highest priority remains i.e. only one output channel $A_j$ is active.

Figure 2:
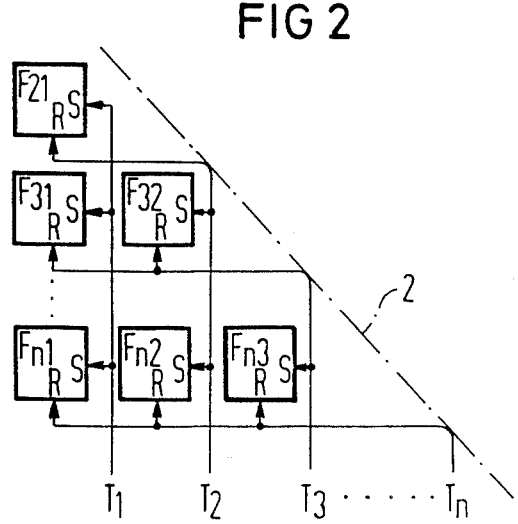
FIG. 2 is a schematic block diagram of a second part of the priority network.

FIG. 2 shows, with respect to the part B, a simplified circuit of the priority network in which a triangle matrix is formed by a fold along the main diagonal 2. To realize a rotating priority sequence, each switching element $V_{ij}$ is preceded by a control element, advantageously a flipflop $F_{ij}$, for storing the priority of a request channel $E_i$ with respect to a further request channel $E_j$. The actual priority sequence is determined by preoccupation of the flipflops $F_{ij}$. If the flipflops are held in a given state, a priority scheme with fixed priorities is produced. In dynamic switching, the priorities rotate.

A combination of held and dynamically switched flipflops $F_{ij}$ permits the production of flexible priority schemes with fixed priorities and the development of groups, within which the priorities rotate.

Figure 3:
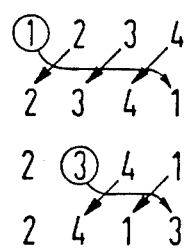
FIG. 3 is a schematic diagram of the course of a priority rotation.

FIG. 3 shows schematically two examples of a rotating priority within groups of four request channels, respectively, $E_i$ (i=1 to 4), which are purported to be of equal importance mutually. To each group there is firmly assigned a common region in the otherwise variable priority sequence.

In the example at the top of FIG. 3, the request of channel $E_i$ is processed. During the processing, this channel $E_i$ is put in line in a priority sequence behind the other channels within the group region. It therefore receives the lowest priority, while the other channels $E_2$, $E_3$ and $E_4$ are, respectively, advanced one place forward.

In the second example, the channel $E_3$ which is in second place is being processed. It is therefore, likewise, placed in line farther to the rear within the priority sequence. In the advance, however, only the channels $E_1$ and $E_4$ are taken into account, which had been weighted or evaluated in the original sequence as being of lower value than the channel $E_3$. The channel $E_2$ which had been weighted or evaluated originally ahead of the channel $E_3$ with the highest priority, retains the high priority thereof.

This kind of rotation rewards channels with infrequent requirements in that they travel or migrate forwardly in the priority sequence.

The dynamic switching of the flipflops $F_{ij}$ is accomplished according to FIG. 2 in such a manner that the setting and resetting inputs S, R are addressed via rotational channels $T_j$. All of the setting inputs S of the flipflops $F_{ij}$ of a column are connected, in this regard, to a rotational input assigned to this column. Furthermore, all of the resetting inputs R of all of the flipflops $F_{ij}$, if desirable or necessary, lie at a rotational channel characterized by the column numbering i.

The rotational channels $T_j$ are activated if the request from the output channel j is processed. If flipflops $F_{ij}$ are to be held in a given state, this must be accomplished in such a way that the setting and resetting inputs S and R do not become operative.

Figure 4:
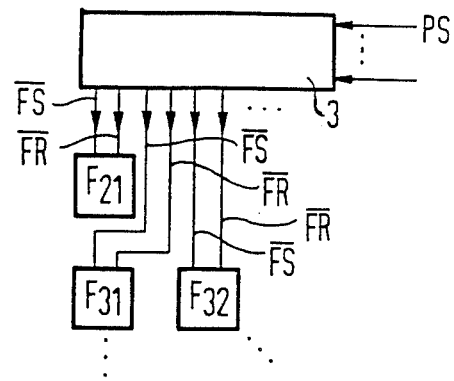
FIG. 4 is a schematic block diagram of a third part of the priority network.
Figure 5:
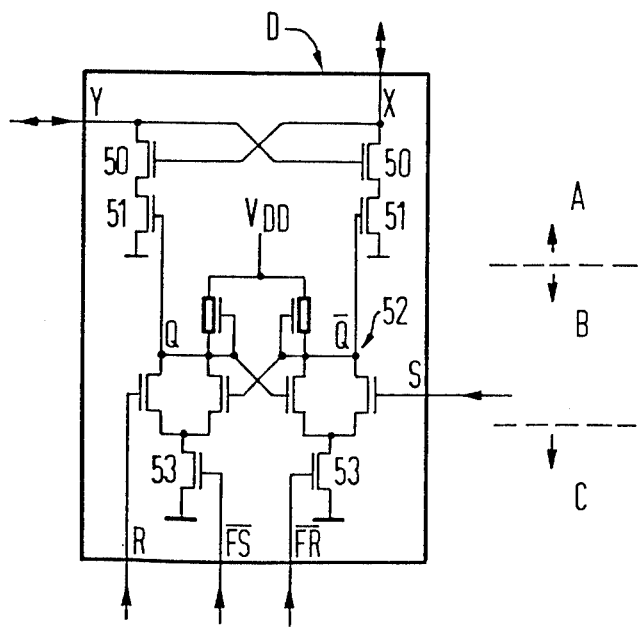
FIG. 5 is a circuit diagram showing details of one of the matrix elements of the priority network.

FIG. 4 shows, with respect to the part C, in which manner fixed priorities can be set within a priority scheme. For this purpose, the flipflops $F_{ij}$ are addressed by respective control signals $\overline{FS}$, $\overline{FR}$, via which they can be held either in the set or in the reset state. If neither of the control signals $\overline{FS}$, $\overline{FR}$ is activated, the appertaining flipflop is switchable dynamically via its setting and resetting inputs S and R. The control signals $\overline{FS}$, $\overline{FR}$ can be taken off at a memory device, such as a ROM, for example, a PLA (programmable logical array) or by any other combinatory logic. It is addressed via address lines PS.

FIG. 5 shows a realized embodiment of a matrix element D in MOS-technology, composed of the functional parts illustrated in FIGS. 1, 2 and 4. The switching elements $V_{ij}$ are formed of two cross-coupled FETs 50 which are addressed, respectively, by decoupled request signals X and by the signals Y present at the output channels $A_j$. The rotational control is formed of further FETs 51 in the control paths of the FETs 50 and of an R-S flipflop 52, via the outputs Q, $\overline{Q}$ of which the FETs 51 are addressed. For realizing the function performed by the part C, FETs 53 are arranged at the bases of the flipflops 52 and are addressed via the signals $\overline{FS}$ and $\overline{FR}$, respectively. A flipflop state is held by separating the base point.

Figure 6:
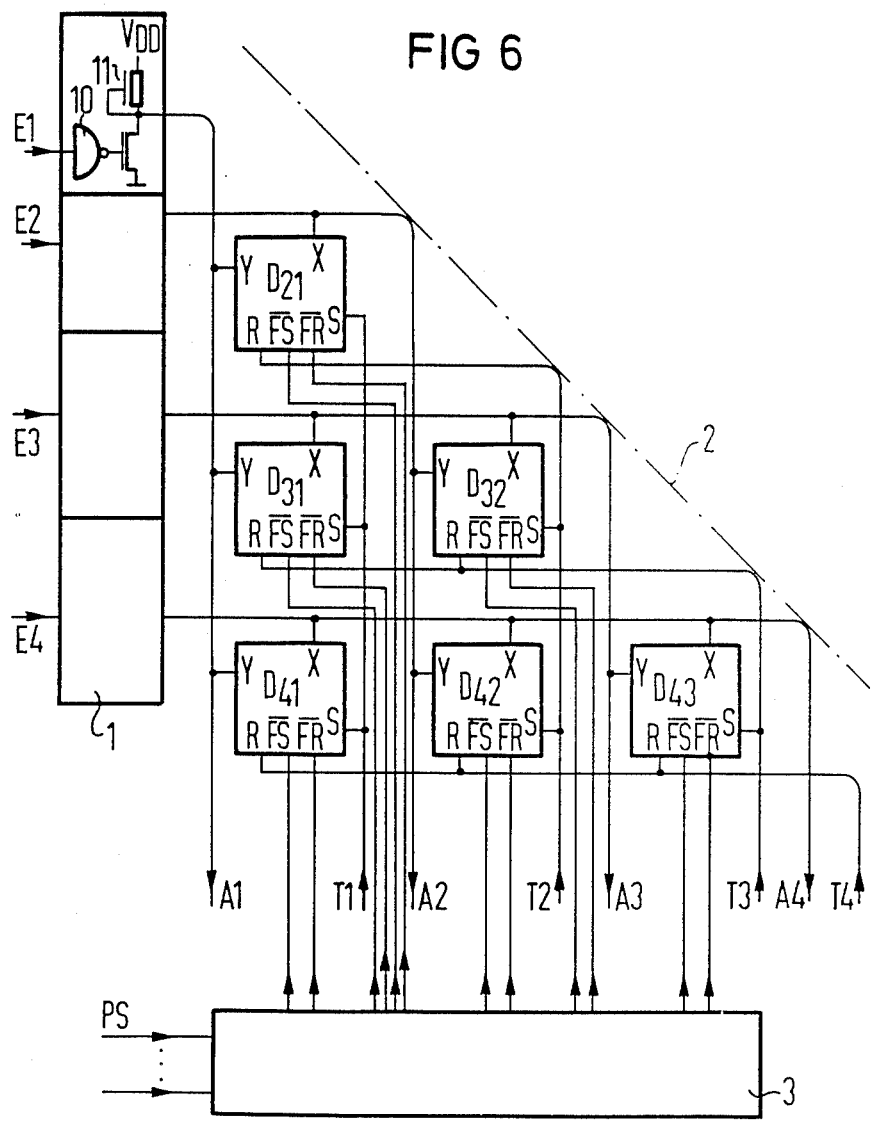
FIGS. 6 and 7 are each schematic block diagrams of different embodiments of the invention.

The exemplary embodiment shown in FIG. 6 is a triangle matrix with four request channels $E_1$ to $E_4$ and four output channels A1 to A4. They are equipped with matrix elements $D_{ij}$ (i=2 to 4, j=1 to i−1). Each of the input channels $E_i$ are decoupled via an inverter and a source circuit connected thereto. The signals $\overline{FS}$, $\overline{FR}$ for holding the flipflop states are stored in a ROM 3 addressed via lines PS.

Figure 7:
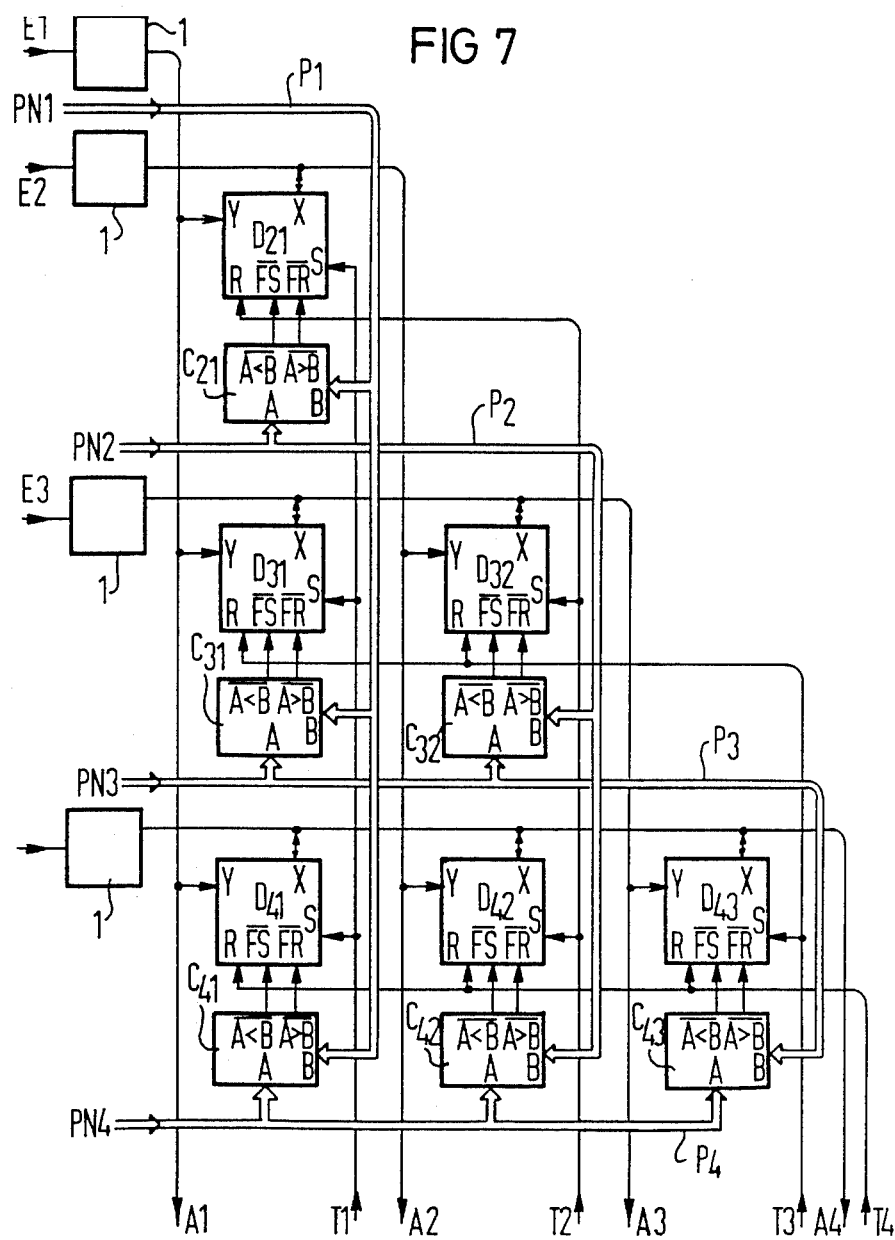

A further advantageous exemplary embodiment of the invention is shown in FIG. 7. In this regard, each request channel $E_i$ is associated with a priority channel $P_i$ for transmitting a priority number $PN_i$ which is provided via a program of a computing system. This priority number $PN_i$ determines the weight or evaluation of the request of the appertaining channel $E_i$. Like priority numbers of several channels $E_i$ lead to the aforedescribed group formation. The priority numbers $PN_i$ and $PN_j$ are mutually compared pairwise in comparators $C_{ij}$, which precede the respective matrix elements $D_{ij}$.

Each comparator $C_{ij}$ compares a priority word $PN_i$ present at the first input A thereof, with a priority word $PN_j$ present at the second input B thereof. In the given exemplary embodiment, the priority word $PN_i$ is fed to the second inputs B of those comparators $C_{ji}$ which are arranged in the matrix column i. The priority word $PN_i$ is further fed to those first inputs A of the comparators $C_{ij}$.

A smaller priority number means a higher priority. Assuming that a request channel $E_i$ has a higher priority than a request channel $E_j$ a priority number $PN_i < PN_j$. In a comparator $C_{ij}$, the priority number $PN_i$ is therefore fed to the input A, and the priority number $PN_j$ is fed to the input B. A logical zero can thereby be taken off at an output $A \overline{<} B$ of the comparator $C_{ij}$ and, as the control signal $\overline{FS}$, hold the appertaining flipflop $F_{ij}$ in the set state. If the priority number $PN_i$ is larger than the priority number $PN_j$, a logical zero is taken off at the second output $A \overline{<} B$ and, as a control signal $\overline{FR}$, holds the flipflop in the reset condition. If the priority number $PN_i = PN_j$, the flipflop can be switched via its setting and resetting inputs $S_j$ and R. Both channels then belong to the same group.

There is claimed:

1. Device for assigning priorities comprising: a plurality of request channels addressed by request signals, having an equal plurality of output channels arranged with the request channels in form of a triangular matrix, each of the request channels being directly connected to one of said output channels and being indirectly connected to the respective remainder of said plurality of output channels via respective switching elements timingly controlled by rotating control means in a rotating priority sequence by the respective request signal blocking the the respective remaining output channels, each switching element having two cross-connected field effect transistors connected between the respective request and output channel.

2. Device according to claim 1 wherein said rotation control means have other FETs addressed in opposite phases and located at base points of said cross-coupled FETs forming said switching elements.

3. Device according to claim 2 wherein said other FETs of said rotation control means are addressed via flipflop.

4. Device according to claim 1 including flip-flops connected with the respective switching elements and having flip-flop states, and a control circuit for holding the respective states, said control circuit having its output connected to the input of the rotation control means.

5. Device according to claim 4 wherein each of the switching elements includes a control circuit having additional FETs connected to base points of said flip-flop.

6. Device according to claim 4 including a memory unit for addressing all of the control circuits, and address lines connected to said memory unit for addressing said memory unit.

7. Device according to claim 4 comprising respective comparators having their outputs connected to the inputs of the respective control circuits.

* * * * *